US005771320A

United States Patent [19]
Stone

[11] Patent Number: 5,771,320
[45] Date of Patent: Jun. 23, 1998

[54] OPTICAL SWITCHING AND ROUTING SYSTEM

[75] Inventor: Thomas W. Stone, Bethlehem, Pa.

[73] Assignee: Wavefront Research, Inc., Bethlehem, Pa.

[21] Appl. No.: 734,139

[22] Filed: Oct. 21, 1996

Related U.S. Application Data

[63] Continuation-in-part of Ser. No. 640,187, Apr. 30, 1996, and Ser. No. 641,195, Apr. 30, 1996.
[51] Int. Cl.$^6$ .............................. G02B 6/26; G02B 6/42
[52] U.S. Cl. ............................................................ 385/16
[58] Field of Search ................................. 385/15, 16, 24, 385/41, 7, 17, 18; 359/110, 161, 158, 140, 173, 123, 125, 137, 127; 250/227.24, 227.11

[56] References Cited

U.S. PATENT DOCUMENTS

| | | | |
|---|---|---|---|
| 4,509,123 | 4/1985 | Vereen | 359/228 |
| 4,871,235 | 10/1989 | Greene et al. | 350/354 |
| 4,947,459 | 8/1990 | Kirkby | 359/127 |
| 5,133,027 | 7/1992 | Funazaki et al. | 385/5 |
| 5,172,258 | 12/1992 | Verber | 359/138 |
| 5,218,198 | 6/1993 | Bristow et al. | 250/227.24 |
| 5,375,004 | 12/1994 | Ogura | 359/139 |
| 5,438,444 | 8/1995 | Tayonaka et al. | 359/123 |
| 5,491,762 | 2/1996 | Deacon et al. | 385/16 |
| 5,546,483 | 8/1996 | Inoue et al. | 385/14 |
| 5,636,138 | 6/1997 | Gilbert et al. | 364/512 |

OTHER PUBLICATIONS

T. Stone and N. George, "Wavelength Performance of Holographic Optical Elements", Applied Optics, 24, 3797 (1985).
T. J. Cloonan, "Free–Space Optical Implementation of a Feed–Forward Crossbar Network," Applied Optics 29, 2006, see FIG. 10 in particular, (1990).
R. T. Ingwall and T. Adams, "Hologram:Liquid Crystal Composites," Proceedings of the SPIE 1555, 279–290 (1991).
Y–T Huang, "Polarization Selective Volume Holograms," Applied Optics, 33, 2115 (1994).
R. L. Sutherland, L. V. Natarajan, V. P. Tondiglia, T. J. Bunning, and W. W. Adams, "Switchable Holograms in New Photopolymer–Liquid Crystal Composite Materials," Proceedings of the SPIE, 2404, 132 (1995).
M. S. Malcuit and T. W. Stone, "Optically Switched Volume Holographic Elements," Optics Letters, 20, 1328 (Jun. 15, 1995)*.
H. Okayama, M. Kawahara, "Experiment On Deflector–selector Optical Switch Matrix," Electronics Letters 28, 638 (1992).
J. M. Heaton, D. R. Wight, J. T. Parker, B. T. Hughes, J. C. H. Birbeck, K. P. Hilton, "A Phased Array Optical Scanning (PHAROS) Device Used As A 1–to–9 Way Switch," IEEE Journal of Quantum Electronics 28, 678 (1992).
H. Okayama, M. Kawahara, "Ti: LiNbO$_3$ Digital Optical Switch Matrices," Electronics Letters 29, 765 (1993).
T. Kirigara, M. Ogawa, H. Inoue, H. Kodera, K. Ishida, "Lossless And Low–crosstalk Characteristics In An InP–Based 4x4 Optical Switch With Integrated Single–stage Optical Amplifiers," IEEE Photonics Technology Letters 6, 218 (1994).

(List continued on next page.)

*Primary Examiner*—Akm E. Ullah
*Attorney, Agent, or Firm*—Jacob N. Erlich; Jerry Cohen

[57] ABSTRACT

The present invention provides a free space optical switching and routing system utilizing a switchable grating based approach together with novel noise suppression techniques. This family of devices provides for an optical switching and routing system that is useful for interconnecting any of an input array's optical channels to any of an output array's optical channels. The incorporation of free space switched grating based routing in the present invention has several distinct advantages including compactness, a reduction in insertion loss and the number of required switching devices and control signals, and improvements in switch isolation, noise and crosstalk suppression, spurious reflections, data skew, and compactness.

34 Claims, 4 Drawing Sheets

OTHER PUBLICATIONS

L. B. Aronson, L. Hesselink, "Analysis And Demonstration Of An Integrated Optical Switch Based On Dynamic Free Carrier Gratings: A Blueprint For a 100×100 Element Switch Array," IEEE Journal Of Quantum Electronics 30, 2332 (1994).

N. Keil, H. H. Yao, C. Zawadzki, "Polymer Waveguide Optical Switch With <−40dB Polarization Independent Crosstalk," Electronics Letters 32, 655 (Mar. 28, 1996)*.

P. C. Huang, W. E. Stephens, T. C. Banwell, L. A. Reith, "Performance Of 4×4 Optical Crossbar Switch Utilizing Acousto–Optic Deflector," Electronics Letters 25, 252, see first Figure in particular, (1989).

A. Chiou, P. Yeh, "Energy Efficiency of Optical Interconnections Using Photorefractive Holograms," Applied Optics 29, 1111 (1990).

D. O. Harris, A. Vanderlugt, "Multichannel Acousto–optic Crossbar Switch with Arbitrary Signal Fan–out," Applied Optics 31, 1684, see FIG. 1 in particular, (1992).

M. Kato, H. Ito, T. Yamamoto, F. Yamagishi, and T. Nakagami, "Multichannel Optical Switch That Uses Holograms," Optics Letters 17, 769, see FIG. 1 in particular (1992).

H. Yamazaki, M. Yamaguchi, "Experiments On A Multichannel Holographic Optical Switch With The Use of A Liquid–Crystal Display," Optics Letters 17, 1228, see FIG. 1 in particular, (1992).

M. Fukui, K. Kitayama, "High–throughput Optical Image Crossbar Switch that Uses A Point Light Source Array," Optics Letters 18, 376 (1993).

Z. Pan, M. Dagenais, "Subnanosecond Optically Addressable Generalized Optical Crossbar Switch With An Aggregate Throughput Rate Of 4.2 Gbit/s," Appl. Phys. Lett. 62, 2185 (1993).

Y. Wu, L. Liu, Z. Wang, "Optical Crossbar Elements Used For Switching Networks," Applied Optics 33, 175 (1994).

K. Hirabayashi, T. Yamamoto, M. Yamaguchi, "Free–space Optical Interconnections With Liquid–crystal Microprism Arrays," Applied Optics 34, 2571 (1995).

T. Sakano, K. Kimura, K. Noguchi, N. Naito, "256×256 Turnover–type Free–space Multichannel Optical Switch Based On Polarization Control Using Liquid–crystal Spatial Light Modulators," Applied Optics 34, 2581 (1995).

Y–T Huang, "Polarization–independent Optical Switch Composed Of Holographic Optical Elements," Optics Letters 20, 1198, see FIG. 1 in particular (1995).

G. G. Yang, S. E. Broomfield, "Programmable Wavefront Generation Using Two Binary Phase Spatial Light Modulators," Optics Communications 124, 345 (1 Mar. 1996).

C. P. Barrett, P. Blair, G. S. Buller, D. T. Neilson, B. Robertson, E.C. Smith, M. R. Taghizadeh, A. C. Walker, "Components For The Implementation Of Free–space Optical Crossbars," Applied Optics 35, 6934 (10 Dec. 1996).*

S. Reinhorn, Y. Amitai, A. A. Friesem, A. W. Lohmann, S. Gorodeisky, "Compact Optical Crossbar Switch," Applied Optics 36, 1039 (10 Feb. 1997).*

OPTICAL SWITCHING AND ROUTING SYSTEM

RELATED APPLICATIONS

This application is a continuation-in part of co-pending U.S. patent application Ser. Nos. 08/640,187 and 08/641,195, both filed on Apr. 30, 1996, with these applications being incorporated herein by reference.

STATEMENT OF GOVERNMENT INTEREST

This invention was made with Government support under Contract No. F3060295-C-0238 awarded by the U.S. Air Force. The Government has certain rights in the invention.

FIELD OF THE INVENTION

The present invention relates generally to interconnection and switching systems, and, more particularly, to optical switching and interconnect systems which incorporate the use of diffractive optics and noise suppressors therein.

BACKGROUND OF THE INVENTION

With the advent of substantial new uses for high bandwidth digital and analog electro-optic systems, there exists a greater need to effectively control the route of electro-optic or optical signals from among many possible paths. This is especially true in digital computing systems where signals must be routed among processors, in analog systems such as phased array radar, and in the switching of high bandwidth optical carriers in communication systems. However, it should be realized that these are just several of numerous electro-optic systems which require the use of an optical switching or routing mechanism.

In many current and future systems light beams are modulated in a digital and/or analog fashion and are used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (without waveguides such as optical fibers) can be packed closely and even intersect in space with greatly reduced crosstalk between channels. Finally, operations that are difficult to perform in the lower (e.g., radio) frequencies such as time shifting for phased array applications can often be performed more efficiently and compactly using optical carriers.

A common problem encountered in applications in which high data rate information is modulated on optical carrier beams is the switching of the optical carriers from among an array of channels. These differing optical channels may represent, for example, routes to different processors, receiver locations, or antenna element modules. One approach to accomplish this switching is to extract the information from the optical carrier, use conventional electronic switches, and then remodulate the optical carrier in the desired channel. However from noise, space, and cost perspectives it is more desirable to directly switch the route of the optical carrier from the input channel to the desired channel, without converting to and from the electronic (or microwave) regimes.

Another common problem arises in applications where there is a need to arbitrarily interconnect any of n electronic input channels to any of n output channels. This "crossbar switch" type of function is difficult to implement electronically. In such a case better performance may be obtained by modulating the electronic information on optical carriers, and switching the optical carriers to the desired channel where they may be reconverted to electronic information if desired. This conversion to optical carriers permits the use of optical switching techniques as in the present invention, as well as providing a ready interface to other optical interconnect schemes.

Finally, another problem that is typical in switching systems is the insertion loss they impose. Some switching systems divide the input signal power into many parts, and block (absorb) the ones that are not desired. Others use switches that are inefficient and absorb or divert a significant part of the input signal.

It is therefore an object of this invention to provide an optical switching and routing system that can independently route the optical carriers from an array of input channels to selected members of an array of output channels.

It is another object of this invention to provide an optical switching and routing system that can independently route the optical carriers from an array of input channels to selected members of an array of output channels including the capability to switch one input channel to more than one output channel if desired.

It is also an object of this invention to provide an optical switching and routing system that provides for a reduced complexity in terms of number of required optical switching elements and control points when compared with many other optical switches.

It is a further object of this invention to provide an optical switching and routing system that exhibits a uniform delay for all possible switching or routing paths, and therefore introduces no relative skew in the switched signals.

It is still a further object of this invention to provide an optical switching and routing system that incorporates a novel noise suppressor device of the type described in co-pending U.S. patent applications Ser. Nos. 08/640,187 and 08/641,195 also assigned to the present assignee to enhance the channel isolation of the switching system and reduce the level of crosstalk among the channels.

It is even further an object of the subject invention to provide an optical switching and routing system that is practically lossless, i.e., the optical power in the input channel is nearly completely directed to the desired output channel(s).

SUMMARY OF THE INVENTION

The present invention overcomes problems associated with complexity and performance, including number of required switching devices and control signals, switch isolation, noise and crosstalk suppression, insertion loss, spurious reflections, data skew, and compactness that are present in other optical switching systems. The present invention includes devices that use high efficiency switched gratings to form high efficiency, free space optical switching, interconnection, and routing networks.

More specifically the present invention utilizes a pair of router assemblies made up of a series of switchable diffractive gratings which are separated by distances varying by powers of 2 and which are each separately switchable in segments for each of a number of channels in the input array. Grating segments of each of the gratings are separately controlled with electrical or optical signals. When a particular grating segment is "on," the beam incident on that segment is completely switched by diffraction with little or no loss from the incident beam to a diffracted beam traveling in a new direction. When the grating segment is switched "off" the incident beam is transmitted with little or no loss and without deviation. These switched gratings therefore steer the incident beam along a selected path as a function of the control signals which turn the various grating segments "on" or "off." Other embodiments of the present invention utilize absorbers therein as well eliminate the use of one of the router assemblies. In such a case outputs are received directly by detectors.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENTS

The present invention provides a "free space" optical switching and routing system 10 wherein the term "free space" when used with the present invention means that the optical channels of the optical switching and routing system are freely propagating without imposed lateral confinement. This "free space" system is in contrast with other "guided-wave" systems wherein the optical channels are confined or guided in structures such as optical fiber waveguides and planar optical waveguides. In order to minimize losses associated with surface reflections, these free space systems will typically include clear dielectric spacers (glass, plastic, etc.) that separate the switched gratings and other components. By optically cementing the spacers and components together, reflection losses at interfaces can be greatly reduced and further the dimensional stability and insensitivity to vibrations and misalignments can be enhanced. The switching and routing system 10 utilizes a switchable grating based approach together with novel noise suppression techniques. Certain concepts utilized in this invention are also described in co-pending U.S. patent application Ser. Nos. 08/640,187 and 08/641,195 also assigned to the present assignee and incorporated herein by reference.

The various embodiments of the optical switching and routing system 10 of this invention is useful for interconnecting any of an input array's optical channels to any of an output array's optical channels. The incorporation of "free space" switched grating based routing in the present invention has several distinct advantages over past optical switching and routing techniques. More specifically these advantages include compactness, a reduction in insertion loss and the number of required switching devices and control signals, improvements in switch isolation, noise and crosstalk suppression, spurious reflections, data skew, and compactness over those present in other switches. Furthermore, the utilization of a "free space" geometry enables the present invention to utilize vertical cavity crosstalk suppressors and facilitates the use of saturable absorber noise suppressers within the system. These noise suppression techniques provide a very large gain and signal purity by suppressing crosstalk, scatter, and multiply-reflected (spurious) waves.

Figure 1:
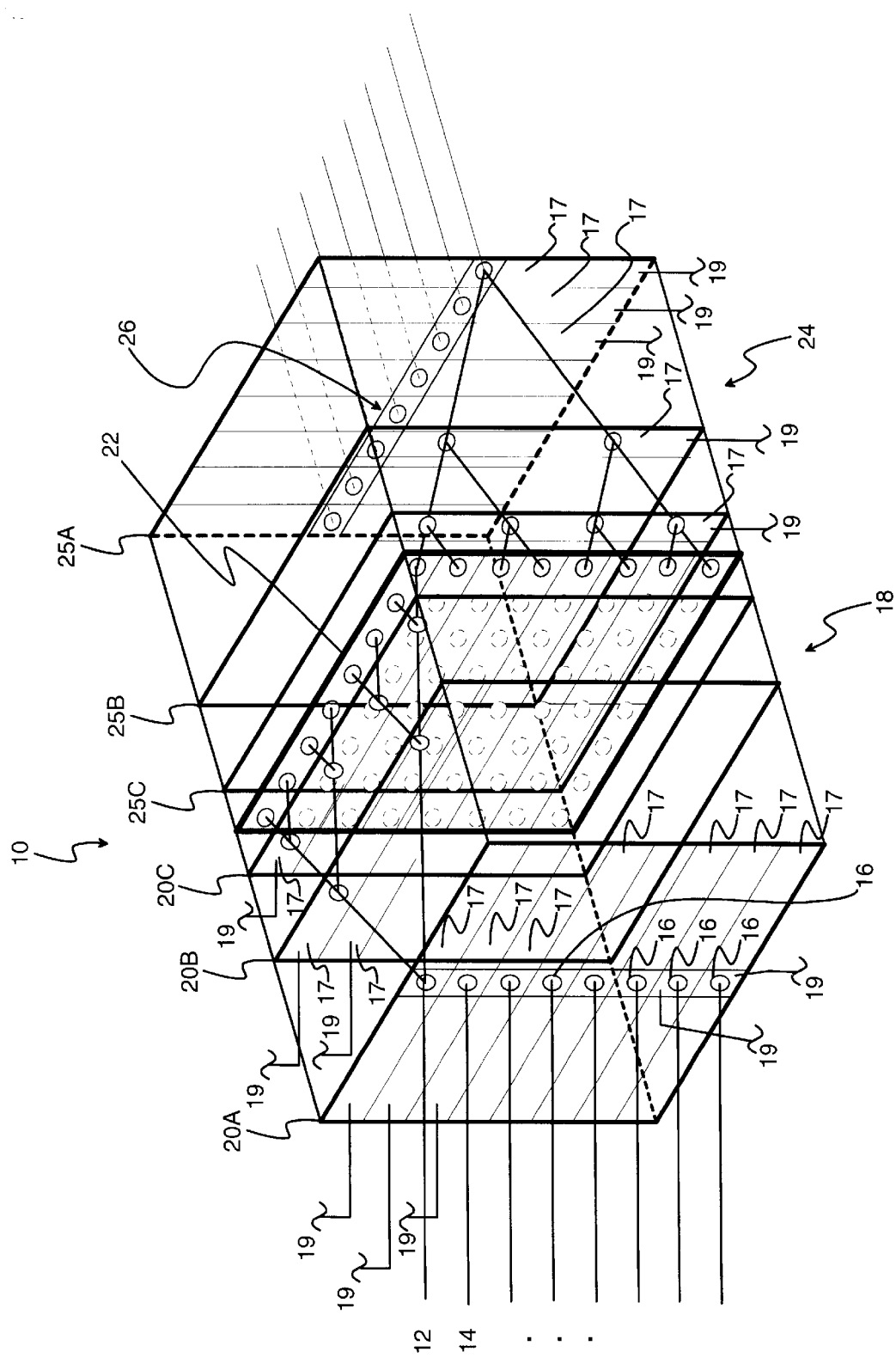
FIG. 1 is a pictorial, schematic representation of the optical switching and routing system of this invention incorporating electrically switchable gratings therein and comprising two cascaded and crossed routing stages.

Reference is now made to FIG. 1 of the drawings. The optical switching and routing system 10 of this invention shown therein utilizes a series of optical input signals 12 and 14, for example, which form a vertical input array of m optical channels 16. These optical input signals 12, 14 may either be directly input to system 10, or they may originate as electrical input signals that are converted into optical signals prior to input in a conventional manner. Accordingly, this input array may include an array of optical fibers, semiconductor lasers (e.g., Vertical Cavity Surface Emitting Lasers or VCSELs), free space beams, or other guides or sources for the optical channels. Following the input array of channels 16 is a first router assembly 18 that includes a cascade of n switchable diffractive gratings 20A, 20B, 20C, etc. (also referred to as gratings 20) which are separated by distances varying by powers of 2 and which are each separately switchable in segments 17 for each of the m channels 16 in the input array. This independent switching of each of the gratings 20 for each input channel can be accomplished by pixellating each of the gratings 20 into m stripe segments 17. These m grating segments 17 of each of gratings 20 are separately controlled with electrical signals 19. When a particular grating segment 17 is "on," the beam incident on that segment is completely switched by diffraction with little or no loss from the incident beam to a diffracted beam traveling in a new direction. When the grating segment 17 is switched "off" the incident beam is transmitted with little or no loss and without deviation. These switched gratings therefore steer the incident beam along a selected path as a function of the control signals 19 which turn the various grating segments 17 "on" or "off."

In the embodiment of FIG. 1, symmetric gratings are shown in which the diffracted and nondiffracted beams form equal angles on opposite sides of the grating normal. This is desirable since the path lengths and propagation delays through the switch are the same for all possible switch settings. Thus each channel will be incident on a respective stripe or segment 17 on each of n independently controlled gratings 20 when propagating through the first router assembly 18. Settings of these segments 17 of n gratings 20 independently route each input channel to any of $2^n$ spatial locations along a row in the central plane 22, as shown in FIG. 1.

In this fashion each input channel 16 in the input array can be independently directed to any of $2^n$ columns in the central plane 22. Further reference can be made the router systems (particularly Figure 9 of co-pending U.S. patent application Ser. No. 08/640,187) for further explanation of aspects of the routing concept used with the present invention.

A nearly identical second router assembly 24 is located adjacent the central plane 22, but is crossed in orientation with respect to the first router assembly 18, so that, for each column in the central plane, it routes the preselected signal incident at any of the locations in a vertical column in the central plane 22 to a single spatial location (channel) in the output array 26. This second router assembly 24 also includes a cascade of switchable diffraction gratings 25C, 25B, 25A, etc. (also referred to as gratings 25) or beam-steering devices. In the second router assembly 24 the gratings are oriented and pixellated vertically to align with the vertical columns described above.

Any redirectional element(s) or grating-type element is placed in the central plane 22 to redirect the beams from the output of the first router assembly 18 to the input of the second router assembly 24. An example of such a grating-type element would be a pixellated and fixed (not switchable) surface relief or volume holographic grating array and is one of a variety of possibilities. In such a case for FIG. 1, a separate grating-type element would cover each of the possible channel locations in the central plane 22 and convert a horizontally off-axis beam from grating 20C in the router assembly 18 into a vertically off-axis beam heading toward the target point on grating 25C of the second router assembly 24. The required grating pattern repeats frequently which reduces the difficulty of fabricating this element.

The operation of the optical switching and routing system 10 of this invention can now be described as a 2-stage process. For example, consider the switching of the first input signal 12 of signals 12, 14 of the 8×8 optical switching and routing system 10 shown in FIG. 1 to the ith one of 8 output channels. The input signal or in this case beam 12 of electromagnetic radiation is incident on the upper horizontal segment 17 of switchable gratings 20A, 20B, and 20C. These 3 grating segments 17 are set to steer the beam to the ith of 8 columns in the central plane 22, where the grating-type element or other redirecting element steers the beam 12 to the second router assembly 24. The vertical segments of switched gratings 25C, 25B, and 25A in line with the ith or respective column of central plane 22 are set to steer the beam 12 to the ith exit channel in exit array 26. FIG. 1 illustrates the possible light paths for input signal 12 in the first router 18. Normally, (for "one to one" switching) the input signal would be directed along only one of these paths.

During operation, control signals 19 effect the "on-off" operation of the gratings 20 and 25 thereby directing the input signals (beams) 16 of each channel to the desired output channels of output array 26. The first router assembly 18 contains n cascaded gratings 20, each of which are pixellated into m separately controllable segments 17. Thus there are n*m control signals 19 required to independently route each of the input channels 16 to its selected column in the central plane 22. The second router assembly 24 also needs m*n control signals 19 to route the selected signal from each column to the desired output channel. The total control line count for a general m channel to m channel switch for this embodiment is thus 2*m*n, where n is the log(base 2) of m. Similarly, the number of switching elements for the configuration of FIG. 1 also scales as mlog2 (m) for an m×m switch, which is a reduction in complexity over other approaches requiring m*m elements. It should be recognized that other embodiments require different calculations.

For example, there are alternate embodiments of this invention which reduce further by a factor of 2 the required switching elements and control lines, and are described hereinbelow with respect to FIGS. 3 and 4. However the 2*m*n complexity in control lines and elements compares favorably with other many other approaches, such as those which divide light across a spatial light modulator. In such systems there are complexities of m*m for control and switches, as well as a system throughput of 1/m, which is a loss that becomes dominant as m becomes large.

It should be appreciated that while often m input channels are switched by this system to combinations of m output channels, it is possible to have an unequal number of input and output channels. For example, 8 input channels can readily be switched among 16 output channels by increasing the number of cascaded gratings in the routers of FIG. 1 from 3 to 4.

Further, in many switched grating techniques (such as some using nematic liquid crystals in gratings) the grating efficiency can be set at intermediate values, rather than completely off or on as described above. Thus, gratings can be electrically set at intermediate efficiency levels and as a result one input channel can be steered and nearly losslessly split to two or more output channels.

Figure 2:
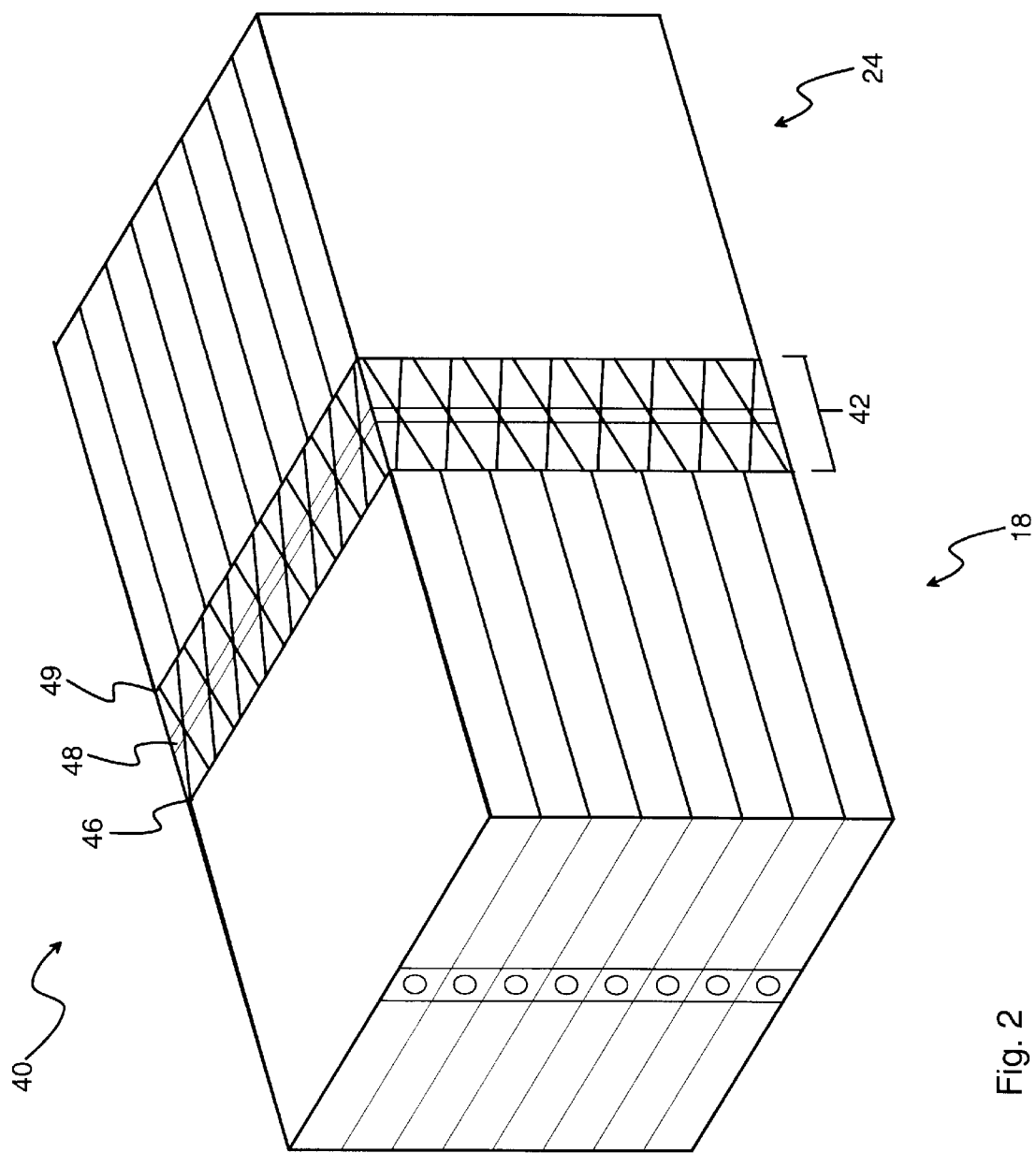
FIG. 2 is a pictorial, schematic representation of the optical switching and routing system of this invention as in FIG. 1 including an active or passive noise suppression stage incorporated therein.

The passive saturable absorber noise suppressor device of U.S. patent application Ser. No. 08/640,187 or the active noise suppressor device of U.S. patent application Ser. No. 08/641,195 can be used to greatly reduce crosstalk and noise in the optical switching and routing system 10 of the present invention. Another embodiment of this invention, depicted as optical switching and routing system 40 is shown in FIG. 2 of the drawings. The basic optical switching and routing system is described in FIG. 1 but is enhanced with the addition of a noise suppressor stage 42 in place of the central plane 22 of the embodiment of FIG. 1. In the embodiment of FIG. 2, the function of the grating-type (redirecting) element in the central plane 22 of FIG. 1 is divided among twin central planes 46 and 49 forming part of noise suppressor stage 42. In plane 46 a redirecting element aligns the beams normal to the plane 46 and focuses the beams (if required) into a noise suppressor device 48, preferably of the types disclosed in U.S. patent application Ser. Nos. 08/640, 187 and 08/641,195. The beams exiting the noise suppressor device 48 are collimated by a redirecting element in plane 49, and directed off-axis toward switched grating 25C (as shown in FIG. 1), continuing through the system as in FIG. 1. While many types of redirecting elements can be used in planes 46 and 49, an array of off-axis diffractive lenses (or alternatively an array of refractive microlenses in cascade with an array of gratings (similar to those used in the central plane 22 of FIG. 1) are particularly well suited.

The noise suppressor 48 can comprise the passive saturable absorber noise suppressor or active vertical cavity crosstalk suppressor, as referenced above. These devices are described in detail in the referenced U.S. patent applications. In usual operation as described with reference to FIG. 1, there is one input beam steered to each column in the central plane. However, in practice, the gratings do not normally exhibit perfect diffraction efficiency and switch purity, and so a small amount of light from the input channel is coupled into the other paths and is spread into other columns in the central plane and thus into nonselected channels. This type of spurious signal turns up as crosstalk in the routing and switching system. The Saturable Absorber Noise Suppressor (SANS) and Vertical Cavity Crosstalk Suppressor (VCCS) are incorporated within this invention to impose a large loss on light propagating in nonselected channels, while imposing little or no loss on light in the selected channels.

For the case of the saturable absorber noise suppressor (SANS), the saturable absorber material is schematically shown as being localized near plane 48 of FIG. 2. This localized embodiment of the SANS is usually desirable since the optical channels may be focused into the material, thus increasing optical intensity and thus increasing the level of nonselected suppression that can be obtained. However, for cases where there is sufficient channel power, a much lower concentration of saturable absorber can be embedded throughout a large part of or the entire switching system. This is still effective since essentially identical performance is obtained whether a strong saturable absorber concentration is used for a short distance, or a weaker concentration of saturable absorber is used for a longer distance. This latter distributed version of the SANS is particularly suitable in other switching, routing, or delay system approaches where waveguides are used—the waveguides constrain the optical channels so the intensity is large, and the saturable absorber may be weakly distributed throughout a large part of or the entire waveguiding structure.

Figure 3:
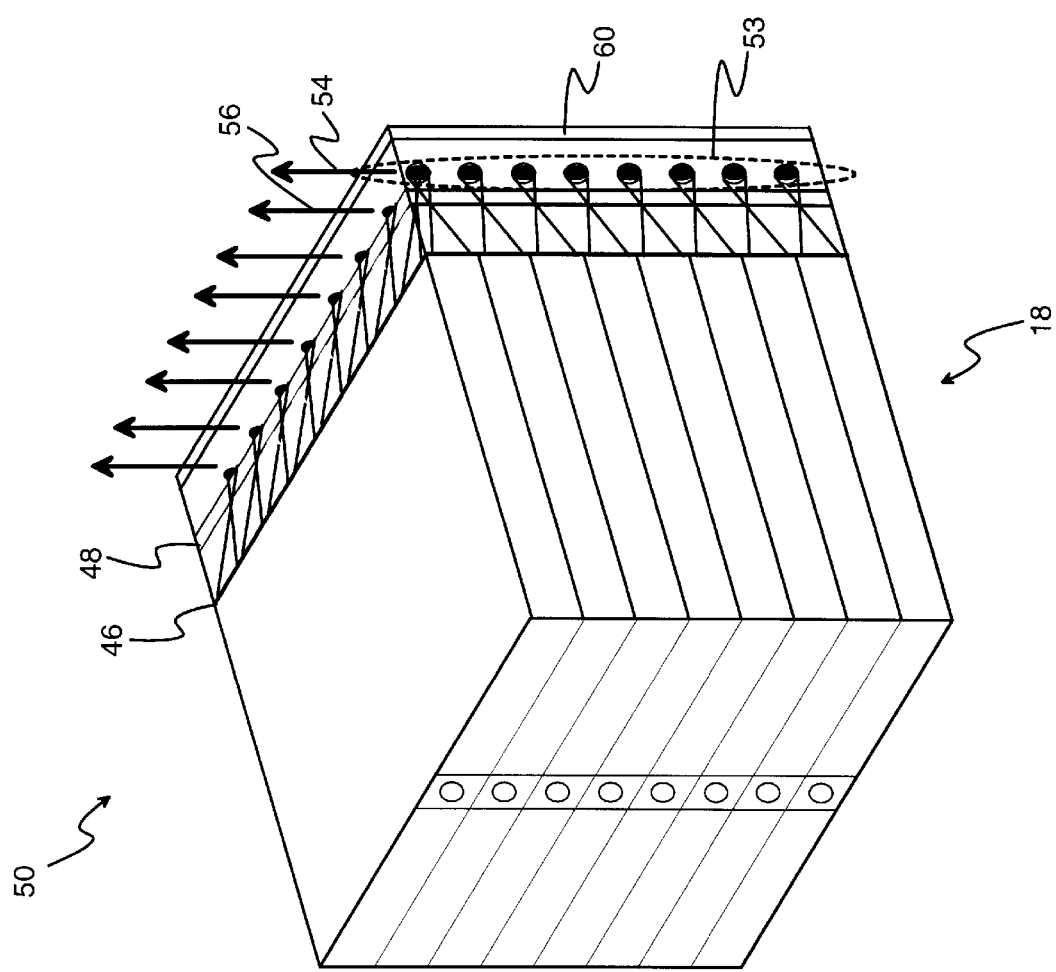
FIG. 3 is a pictorial, schematic representation of a further embodiment of the optical switching and routing system of this invention in which the second routing stage of the configuration shown in FIG. 2 is replaced by an array of line-integrating detectors.

Another embodiment of this invention is illustrated in FIG. 3 of the drawings as system 50, where the second router assembly 24 from FIG. 2 is replaced by a vertically-summed (or vertically integrated) array of detectors 60. As in FIG. 2, a redirecting element focuses light from each location in plane 46 preferably into noise suppressor 48. In FIG. 3, however, each of the mxm possible beam locations are detected after the noise suppressor 48, in detector plane 60. The output from this array of detectors 60 is summed vertically in the m columns, providing the array of m output channels. For example, the eight possible beam locations along the column 53 exiting the noise suppressor 48 are each detected and summed vertically providing output channel 54. Usually, although the members of a given column are summed, the entire desired signal is usually derived from a single column element. The vertical summation can be accomplished with integrating electronics connecting all the detectors in a column, or alternatively by using one long vertical stripe detector. This process is continued providing the next output channel 56 from summing the next column, and so on providing an array of m output channels. While this configuration is a simplified version of the present invention as it requires only half the number of gratings and control signals, it does require more or larger detectors. Wire lengths may be balanced in the electronic summing process to maintain the absence of introduced signal skew from the routing and switching system 50.

Figure 4:
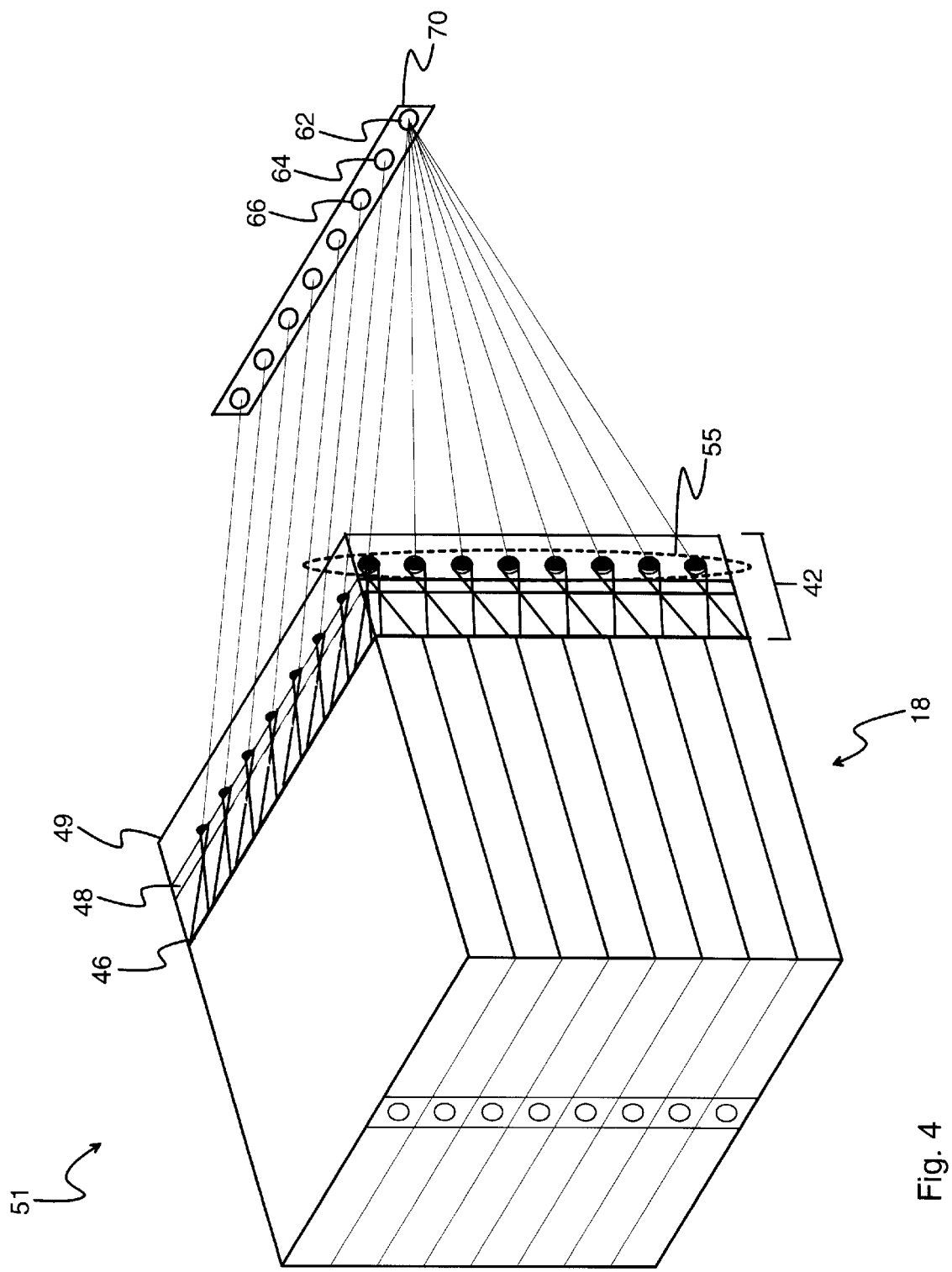
FIG. 4 is a schematic representation of a further embodiment of the optical switching and routing system of this invention in which the second routing stage of the configuration shown in FIG. 2 is replaced by a linear detector array.

Another embodiment of this invention depicted by routing and switching system 51 is illustrated in FIG. 4 of the drawings, where the second router assembly 24 from FIG. 2 is eliminated, and a simpler recombination stage is substituted. The front half of the configuration of FIG. 4 is unchanged from that in FIG. 2, as first router assembly 18 is followed by a noise suppressor stage 42. However, the redirecting element in central plane 49 is designed to direct and focus each of the m possible beam locations in each column to a common detector for that column and output channel. For example, the eight possible beam locations along the column 55 exiting plane 49 of FIG. 4 are focused to detector element 62 as illustrated. The eight beam locations of the next column in will be focused onto detector element 64, and so on for element 66 and all m members of output array 70, which in this case provides output electrical signals. This configuration reduces the number of elements and control lines as does the configuration of FIG. 3, and further only requires m detectors. However, the skews (variations in path lengths with channel selection) in this configuration, although reduced, are not necessarily eliminated.

The embodiments of the optical switching and routing systems described herein utilize volume phase diffraction gratings that permit switching of the incident energy between two or more orders. The primary mechanisms considered which permit this diffracted-order switching are electrical switching, optical switching, and polarization switching. The switched gratings can be optically switched, electrically switched, polarization switched, or switched based on other mechanisms. Currently it is preferred that electrical and polarization switching techniques are used with the present invention since they are extremely fast (switching times in the microsecond regime or faster). Electrical switching can be obtained in materials such as Polaroid DMP-1 28 photopolymer (as described below) or, for example, polymer dispersed liquid crystals. So as to provide an example of a switching mechanism, one of the electrical switching techniques is described below. Further, switching to intermediate diffraction efficiency status permits switching of a given input signal to more than one output channel ("fan out" as opposed to "one to one" switching).

Recently it has been demonstrated in the literature that high efficiency volume diffraction gratings which are recorded in permeable media, such as the DMP-128 photopolymer manufactured by Polaroid Corporation, Cambridge, Mass., can be made to be rapidly switchable between high and low diffraction efficiency states under electric control by imbibing the structure with nematic liquid crystals. In this technique the crystals are rotated by the applied electric field and their refractive index is switched between ordinary and extraordinary values. By choosing the materials so that one of these switchable values matches that of the host grating material, the grating modulation is effectively switched "off" and "on," thus switching the diffraction efficiency of the gratings and toggling the diffracted beam between the 0 and first diffracted order.

It should also be appreciated that while the switching systems described above use switched transmission diffractive gratings, switched reflective gratings (switchable mirrors) can also be used to form similar switching and routing configurations. For example, the switched gratings may be made holographically as in the case of the DMP-128 composites described above. Instead of interfering two beans on the same side of the recording material during holographic fabrication as used to form transmission gratings, two interfering beams may be introduced from opposite sides of the recording material plane, forming a reflection volume diffraction grating. This type of diffraction structure, which is similar to dielectric mirrors, can be made switchable and used to build dual switching systems to those described here. A subtle advantage of these "switched mirror" versions is that they exhibit reduced or no dispersion in diffracted angle with variation in incident wavelength. This can be particularly useful for the case of high bandwidth modulation on the optical carriers. The "free space" beams that propagate through this device can be micro-optic in nature, so that their dimension is made small but not so small that diffraction spreading causes significant crosstalk between channels. As a result, the practical switches of this invention can be made compact.

Typically there is one optical beam per input channel, and these beams are modulated with digital and/or analog information. However, if desired for greater throughput, more than one modulated beam can be grouped in a given channel. In such a case, all of the grouped beams would be switched and routed as a unit.

As described earlier, reference can be made the router systems of Figure 9 of co-pending U.S. patent application 08/640,187 for further explanation of the routing concept used with the present invention. Also, other non-symmetric routing systems and variations described in the co-pending application may similarly be used as the basis for the optical switching systems of the current invention. For example, a tri-state grating cascade can be used to form related switching systems.

Although the invention has been described with reference to particular embodiments, it will be understood that this invention is also capable of further and other embodiments within the spirit and scope of the appended claims. For example other concepts set forth in the co-pending applications referenced herein can also be incorporated with the present invention.

What is claimed is:

1. An optical switching and routing system comprising:
   a first router assembly, a second router assembly optically aligned with said first router assembly, and a central plane having an optical redirecting component therein interposed between said first router assembly and second router assembly;
   said first router assembly being capable of receiving a plurality of individual beams of electromagnetic radiation and having a predetermined orientation, said first router assembly including means defining a plurality of independently controlled segments for directing said plurality of individual beams of electromagnetic radiation from preselected locations along said segments to preselected locations on said optical redirecting component in said central plane; and
   said second router assembly being different in orientation from said predetermined orientation of said first router assembly, said second router assembly including means defining a plurality of independently controlled segments for receiving each of said individual beams from said optical redirecting component and directing said individual beams for output from said second router assembly.

2. An optical switching and routing system as defined in claim 1 wherein said first router assembly comprises at least one switchable diffractive element.

3. An optical switching and routing system as defined in claim 2 wherein said segments of said first router assembly are oriented differently from said segments of said second router assembly.

4. An optical switching and routing system comprising:
   a first router assembly and a second router assembly optically aligned with one another;
   said first router assembly being capable of receiving a plurality of individual beams of electromagnetic radiation and having a predetermined orientation, said first router assembly including means defining a plurality of independently controlled segments for directing said plurality of individual beams of electromagnetic radiation from preselected locations along said segments for input into said second router assembly; and
   said second router assembly being different in orientation from said predetermined orientation of said first router assembly, said second router assembly including means defining a plurality of independently controlled segments for receiving each of said individual beams from said first router assembly and directing said individual beams for output from said second router assembly.

5. An optical switching and routing system as defined in claim 4 wherein said segments of said first router assembly are oriented differently from said segments of said second router assembly.

6. An optical switching and routing system as defined in claim 5 wherein said segments of said router assemblies are rotated 90 degrees with respect to one another.

7. An optical switching and routing system as defined in claim 4 wherein said first router assembly comprises at least one switchable diffractive element.

8. An optical switching and routing system as defined in claim 7 wherein said second router assembly comprises at least one switchable diffractive element.

9. An optical switching and routing system as defined in claim 7 wherein said diffractive elements are diffractive gratings.

10. An optical switching and routing system as defined in claim 4 further comprising a noise suppressor means optically associated with said first and said second router assemblies for preventing the coupling of electromagnetic radiation from said individual beams onto nonpreselected segments.

11. An optical switching and routing system as defined in claim 7 operational in free space.

12. An optical switching and routing system comprising:
    a router assembly and means for detecting beams of electromagnetic radiation optically aligned with said router assembly;
    said router assembly being capable of receiving a plurality of individual beams of electromagnetic radiation and having a predetermined orientation, said router assembly including means defining a plurality of independently controlled segments for receiving said plurality of individual beams of electromagnetic radiation from preselected locations along said segments and directing said individual beams to preselected locations on said detecting means; and
    said detecting means defining a plurality of segments different in orientation than said predetermined orientation of said router assembly for receiving each of said individual beams from said router assembly and for outputting signals therefrom.

13. An optical switching and routing system as defined in claim 12 wherein said segments on said router assembly and said detecting means are oriented 90 degrees with respect to one another.

14. An optical switching and routing system as defined in claim 12 wherein said router assembly comprises at least one switchable diffractive element.

15. An optical switching and routing system as defined in claim 14 wherein said diffractive element is a diffractive grating.

16. An optical switching and routing system comprising:
    a router assembly, means for detecting beams of electromagnetic radiation and an optical redirecting component interposed between said router assembly and said detecting means;
    said router assembly being capable of receiving a plurality of individual beams of electromagnetic radiation and having a predetermined orientation, said router assembly including means defining a plurality of independently controlled segments for directing said individual beams to preselected locations on said optical redirecting component, said optical redirecting component being operationally oriented differently than said predetermined orientation of said router assembly; and
    said optical redirecting component directing said individual beams to said detecting means for output therefrom.

17. An optical switching and routing system as defined in claim 16 wherein said router assembly comprises at least one switchable diffractive element.

18. An optical switching and routing system as defined in claim 17 wherein said diffractive element is a diffractive grating.

19. An optical switching and routing system as defined in claim 16 operational in free space.

20. An optical switching and routing system as defined in claim 7 wherein said switchable diffractive element is a switchable mirror.

21. An optical switching and routing system as defined in claim 14 wherein said switchable diffractive element is a switchable mirror.

22. An optical switching and routing system as defined in claim 17 wherein said switchable diffractive element is a switchable mirror.

23. An optical switching and routing system comprising:
a router assembly, an optical redirecting component optically aligned therewith, a noise suppressor optically aligned with said optical redirecting component and means for detecting beams of electromagnetic radiation optically aligned with said noise suppressor;
said router assembly being capable of receiving a plurality of individual beams of electromagnetic radiation and having a predetermined orientation, said router assembly including means defining a plurality of independently controlled segments for directing said individual beams to preselected locations on said optical redirecting component;
said detecting means defining a plurality of segments having a different orientation than said predetermined orientation of said router assembly for receiving each of said individual beams from said optical redirecting component after having passed through said noise suppressor and outputting signals therefrom.

24. An optical switching and routing system comprising:
a router assembly, a first optical redirecting component optically aligned therewith, a noise suppressor optically aligned with said first optical redirecting component, a second optical redirecting component optically aligned with said noise suppressor and a means for detecting beams of electromagnetic radiation optically aligned with said noise suppressor;
said router assembly being capable of receiving a plurality of individual beams of electromagnetic radiation and having a predetermined orientating, said router assembly including means defining a plurality of independently controlled segments for directing said individual beams to preselected locations on said first optical redirecting component, through said noise suppressor and onto said second optical redirecting component; and
said second optical redirecting component directs said individual beams to said detecting means for output therefrom.

25. An optical switching and routing system as defined in claim 1 wherein each of said individual beams of electromagnetic radiation received by said first router assembly is in any one of a plurality of input channels within an input array and is directed by said first and said second router assemblies to at least one preselected channel of a plurality of output channels within an output array.

26. An optical switching and routing system as defined in claim 4 wherein each of said individual beams of electromagnetic radiation received by said first router assembly is in any one of a plurality of input channels within an input array and is directed by said first and said second router assembly to at least one preselected channel of a plurality of output channels within an output array.

27. An optical switching and routing system as defined in claim 12 wherein each of said segments of said detecting means comprises a plurality of detecting elements.

28. An optical switching and routing system comprising:
means for receiving at least one incident signal of electromagnetic radiation, said receiving means including n cascaded switching stages, at least one of said switching stages comprises a diffractive element, and each of said cascaded switching stages having a predetermined separation therebetween,
said predetermined separation between said stages vary from one from another as powers of an integer, said integer being at least 2,
said cascaded switching stages directing said at least one incident signal to at least one of I spatial locations, wherein i is an integer, and wherein said incident signals propagate through said stages of said switching and routing system in free space.

29. An optical switching and routing system comprising:
first and second routing assemblies, said router assemblies being optically aligned with one another, said first router assembly having a preselected orientation and said second router assembly having an orientation different from said first router assembly;
each of said router assemblies including n cascaded switching stages, each of said cascaded switching stages having a predetermined separation therebetween; and
wherein at least done signal of electromagnetic radiation received by said first router assembly is in any one of a plurality of input channels and is directed by said first and said second router assemblies to at least one preselected channel of a plurality of output channels.

30. An optical switching and routing system comprising:
first switchable diffractive means for receiving a beam of electromagnetic radiation and for selectively directing said beam into at least first and second optical paths;
second switchable diffractive means interposed within said optical paths for receiving said beam of electromagnetic radiation and selectively directing said beam of electromagnetic radiation following said first optical path into at least third and forth optical paths, and for selectively directing said beam of electromagnetic radiation following said second optical path into at least fifth and sixth optical paths;
means operably associated with said first and second means for controlling the path taken by said beam of electromagnetic radiation;
means for receiving said beam of electromagnetic radiation after having passed through a predetermined combination of said optical paths; and
means for directing said beam of electromagnetic radiation after having passed through a predetermined combination of said optical paths to said receiving means.

31. An optical routing system as defined in claim 29 further comprising means interposed between said directing means and said receiving means for suppressing unwanted signals resulting from the passage of said beam of electromagnetic radiation through said predetermined combination of said optical paths.

32. An optical routing system as defined in claim 29 further comprising a plurality of additional beam receiving and directing means for permitting said beam of electromagnetic radiation to follow a predetermined number of further different optical paths.

33. An optical routing system as defined in claim 29 wherein each of said receiving and directing means comprises a diffractive element controlled by an electrical signal.

34. An optical routing system as defined in claim 29 wherein said optical paths are created in free space devoid of external boundaries.

* * * * *

UNITED STATES PATENT AND TRADEMARK OFFICE
CERTIFICATE OF CORRECTION

| | |
|---|---|
| PATENT NO. : 5,771,320 | Page 1 of 1 |
| DATED : June 23, 1998 | |
| INVENTOR(S) : Thomas W. Stone | |

It is certified that error appears in the above-identified patent and that said Letters Patent is hereby corrected as shown below:

<u>Column 1</u>,
Line 13, "Contract No. F3060295-C-0238" should read -- Contract Nos. F30602-95-C-0238 and F30602-97-C-0198 --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.   : 5,771,320
DATED        : June 23, 1998
INVENTOR(S)  : Thomas W. Stone It is certified that error appears in the above-identified patent and that said Letters Patent is hereby corrected as shown below:

Column 12,
Lines 50, 56, 61 and 64, claims 31, 32, 33 and 34, line 1 of each claim, "29" should read -- 30 --.

Signed and Sealed this

Tenth Day of June, 2003

JAMES E. ROGAN
*Director of the United States Patent and Trademark Office*